Oct. 9, 1951 — R. S. HOUGHTON — 2,570,240
GLIDER TAIL JACK HANDLE
Filed April 19, 1946
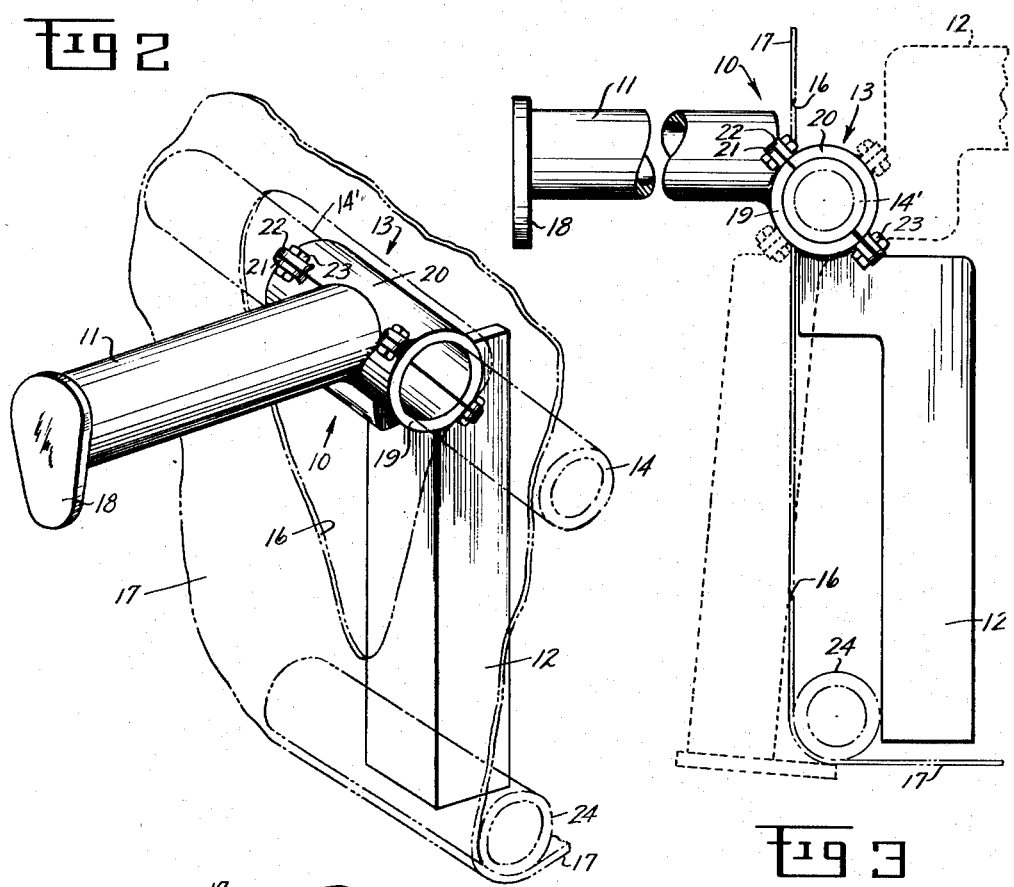
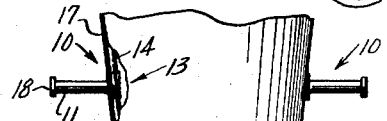
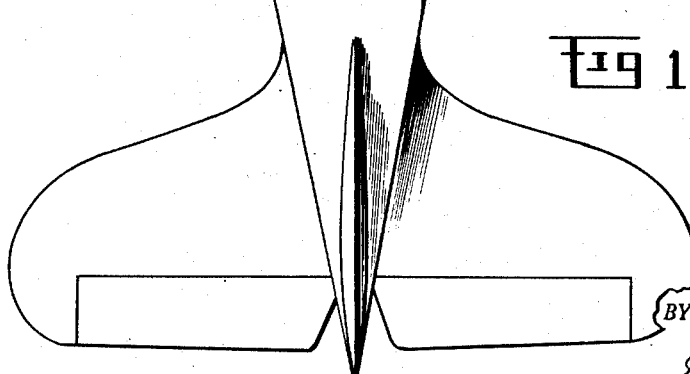
INVENTOR.
ROWELL S. HOUGHTON
BY
— ATTORNEYS —

Patented Oct. 9, 1951

2,570,240

UNITED STATES PATENT OFFICE 2,570,240

GLIDER TAIL JACK HANDLE

Rowell S. Houghton, Portland, Oreg.

Application April 19, 1946, Serial No. 663,338

3 Claims. (Cl. 16—112)

(Granted under the act of March 3, 1883, as amended April 30, 1928; 370 O. G. 757)

The invention described herein may be manufactured and used by or for the Government for governmental purposes without payment to me of any royalty thereon.

This invention relates to a novel handhold member adapted for use in lifting and moving and likewise in supporting a section of an aircraft, and more particularly the tail section of a glider.

In a glider and similar aircraft, the tail section of the fuselage framework contains a longitudinally extending bar, and it is used as a handhold bar in lifting the section and also in supporting the section. For that reason, an aperture or recess is generally provided in the covering material on the outside of said bar, such material usually consisting of fabric on the gliders, so that the hand can conveniently grasp the bar through this recess in lifting and shifting said tail section around and also for purposes of supporting said section. The gliders are conventionally provided on the two opposite sides of the tail section with such recesses and such handhold bars, and formerly a beam or bar of tubing, about five feet long, was passed through said opposite recesses and engaged under said opposite handhold bars, so as to extend therebeyond. Jack members were then placed under said projecting ends of said beam or tubing to support and likewise to level the glider tail section thereby, especially during the time of loading and unloading of the glider and the like.

An essential object of this invention is to provide handhold means which is readily mountable on a glider and similar aircraft and is readily accessible and conveniently operable, whereby to facilitate lifting and supporting a section of the aircraft, especially the tail section of a glider and the like.

A more particular object of this invention is to provide a jack handle, preferably in the form of a bellcrank lever, arranged and adapted to be readily mounted on the handhold bar of the glider frame structure and to be extendible from the hand-grip recess provided in the tail section of the glider, so that this lever comprises a conveniently graspable arm or handle whereby to lift and shift the glider section around and likewise to support the section in a stationary position, and which handle while idle will be located out of the way.

These and various other objects and advantages are attained with this invention, as will become apparent from the following description, taken in connection with the accompanying drawing wherein this invention is shown in its preferred form, it being evident that other arrangements and forms of construction may be resorted to in carrying out the objects and purposes of this invention.

In the drawings:

Fig. 1 is a plan view of the tail section of a glider or similar aircraft having my invention applied thereto.

Fig. 2 is a perspective view showing this invention in its operative position, in connection with a part of an aircraft frame structure shown in dotted outline.

Fig. 3 is a side elevational view of this invention shown in full lines in its operative position, and in dotted lines in its inoperative position.

Briefly stated, this novel lifting device 10 comprises an arm 11 which is adapted to function as a lifting or supporting arm, and a brace member or arm 12 extending from one end of said arm 11 and serving as brace means and stop means to limit the outward movement of arm 11 and to brace it in its operative position. Means 13 is also provided at the junction of arm 11 and member 12 whereby to mount this device swingably on a frame bar of the aircraft framework, and more especially on the frame bar 14 which extends longitudinally of the conventional frame structure of the tail section or empennage 15 of the glider. A hand grip recess 16 is generally provided in the skin material 17 of the tail section, which is usually strong fabric, in order to provide convenient access for the hand to the bar 14 and thus produce a readily graspable handhold bar 14' of said exposed part of the frame bar.

For the purpose of illustration, this lifting device 10 is herein shown in the form of a bellcrank lever, which includes the lifting arm 11 shown in the shape of a supporting arm or handle provided with an end lip 18 which prevents the hand or some supporting member from slipping away from said handle; and the member 12 is in the form of an angle bar extending substantially at right angles from one end of said handle 11. The mounting means 13 herein is shown as a split sleeve or piece of tubing including the lower semitubular part 19 which is secured to the handle 11 and to the bar 12 and which engages under the handhold bar 14', and also includes an upper semi-tubular part 20 which engages over said bar 14' and is detachably secured to said part 19, by apertured lugs 21 and 22 on said sections 19 and 20, respectively, and suitable bolts 23 fastened therethrough, so that this device can be readily and detachably mounted on the handhold bar 14' to be rotary thereon.

It should be noted that in an idle position the handle arm 11 of this lever rotates or swings into a suspended position and normally depends from bar 14, as shown by dotted outline in Fig. 3. For this purpose the handle 11 may be made heavier than the brace arm 12, or the mounting means 13 may be held frictionally turnable on bar 14' by tightening the bolts 23, while said arm in such idle position then extends inwardly into the tail section 15 of the glider. To move handle 11 into its active supporting position, it is readily swung outwardly from the aircraft framework, to extend substantially horizontally therefrom, as shown in Figs. 2 and 3; while the brace arm 12 then engages against the framework, herein shown as a frame bar 24 which is located below frame bar 14 on the frame structure, and the brace bar 12 thus serves as a stop to limit the outward swinging movement of handle 11. This handle 11 with its end lip 18 is conveniently grasped and held by the hand for lifting and shifting the associated section of the aircraft, and it is likewise convenient for use in placing a stationary jack member under said handle for supporting the section and leveling it in a stationary position, and when the device is again idle, it will drop into its depending and out-of-the-way position on the side of the recess and tail section of the glider.

I claim:

1. A tail jack handle lifting device for an aircraft glider having a skin covering formed with a hand grip recess therethrough, an upper cylindrical longitudinal frame bar member extending across the upper portion of the recess to provide a cylindrical hand-hold bar portion, a lower longitudinal frame bar member extending below the upper cylindrical frame bar member in vertically spaced relation thereto; said tail jack handle lifting device comprising an elongated handle portion formed at one end with a semicylindrical bearing portion straddling half of the cylindrical hand-hold bar portion and its other end projecting through the hand grip recess at one side of the lower longitudinal frame bar member, an elongated brace stop member rigidly secured to the semicylindrical bearing portion and extending therefrom at an angle to the handle portion at the opposite side of the lower longitudinal frame bar member and engageable with the lower longitudinal frame bar member below the hand grip recess to limit outward swinging movement of the elongated handle portion to an operative position through said hand grip recess, a semicylindrical cap member straddling the other half of the cylindrical hand hold bar portion, and means detachably securing the cap member to the semicylindrical bearing portion for retaining the handle bar lifting device on the hand-hold bar portion.

2. A tail jack handle attachment for gliders and the like having a tail section formed with a hand grip recess therein, a longitudinally extending horizontal cylindrical hand hold bar graspable through the recess and a fixed longitudinally extending horizontal stop bar located within the recess in vertically spaced relation to the hand hold bar below the same; said handle attachment comprising an elongated cylindrical bearing sleeve split longitudinally into semicylindrical bearing portions and rotatably supported on the hand hold bar, one of said semicylindrical bearing portions having an elongated jack handle projecting radially therefrom through the hand grip recess at one side of the horizontal stop bar and greater in length than the distance between the hand hold bar and the stop bar, a stop arm projecting within the recess radially from the last mentioned semicylindrical bearing portion to a position at the opposite side of the stop bar in 90° angular relation to the jack handle and greater in length than the distance between the hand hold bar and the stop bar; whereby the jack handle attachment may be inserted through the hand hold recess and directly positioned on the hand hold bar intermediate its ends by separating the semicylindrical bearing portions, mounting them on the hand hold bar and securing them together with the jack handle projecting through the recess at one side of the stop bar and the stop arm disposed at the opposite side of the stop bar for movement limiting engagement with the stop bar as the jack handle is swung outwardly and upwardly in said recess to an operative horizontal position.

3. Apparatus as claimed in claim 2 in which the outer extremity of the jack handle projects below the stop bar, when the jack handle is swung downwardly in the hand hold recess toward the stop bar, and is formed with a lateral projection extending therefrom under the stop bar when the jack handle is moved to inoperative position adjacent the stop bar, and to project downwardly to form an abutment shoulder at the end of the jack handle when the same is in horizontal operation.

ROWELL S. HOUGHTON.

REFERENCES CITED

The following references are of record in the file of this patent:

UNITED STATES PATENTS

| Number | Name | Date |
|---|---|---|
| 617,360 | Sargent | Jan. 10, 1899 |
| 881,395 | Gillen | Mar. 10, 1908 |
| 1,301,176 | Sargent | Apr. 22, 1919 |
| 2,011,253 | Nightingale | Aug. 13, 1935 |

FOREIGN PATENTS

| Number | Country | Date |
|---|---|---|
| 636,773 | France | Apr. 16, 1928 |